C. WAIBEL.
FOOD CONTAINER.
APPLICATION FILED MAY 20, 1918.
1,288,313.
Patented Dec. 17, 1918.
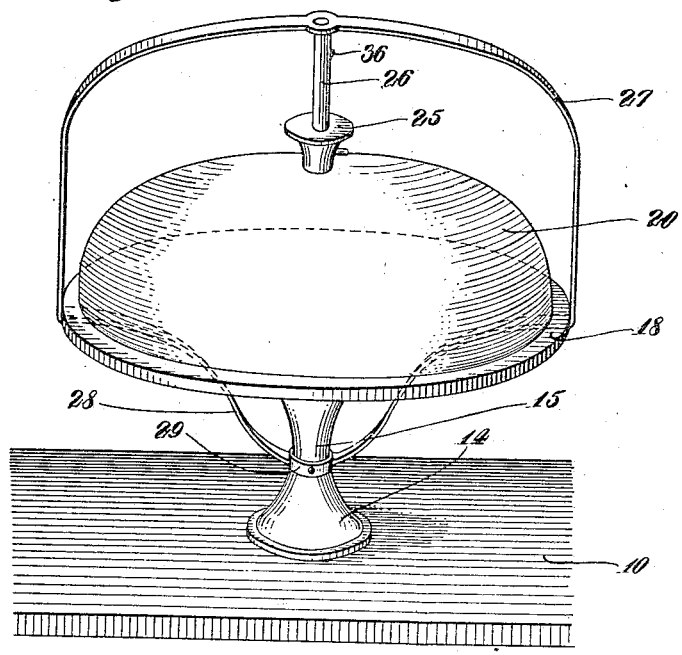
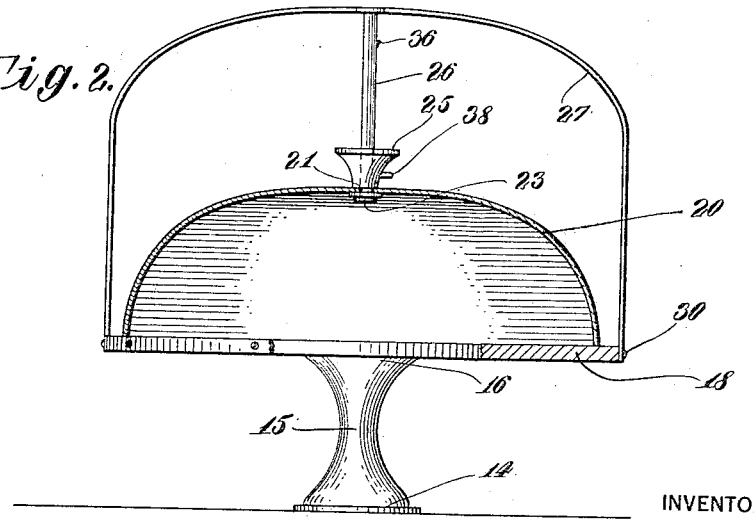
INVENTOR
Charles Waibel
BY
his ATTORNEY C. WAIBEL.
FOOD CONTAINER.
APPLICATION FILED MAY 20, 1918.
1,288,313.
Patented Dec. 17, 1918.
2 SHEETS—SHEET 2.
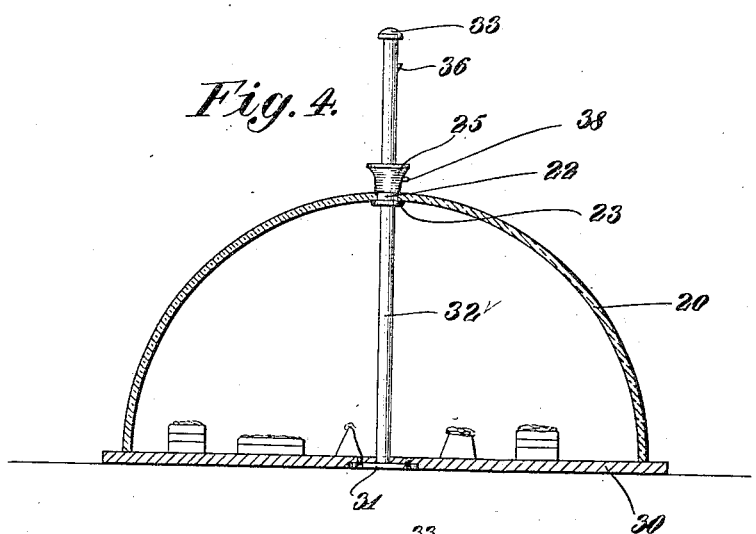
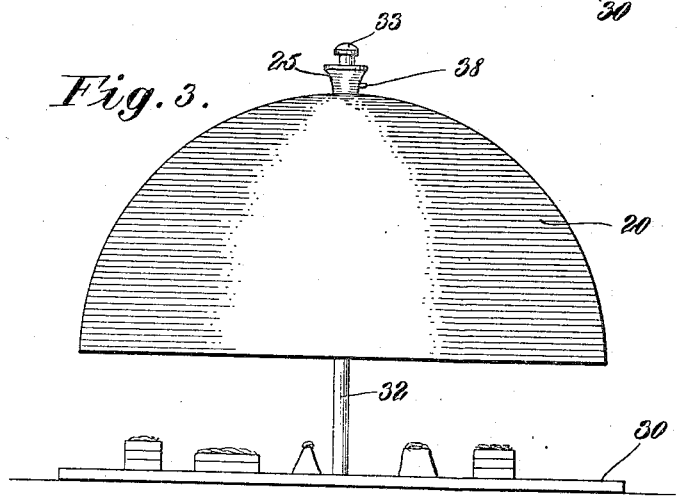
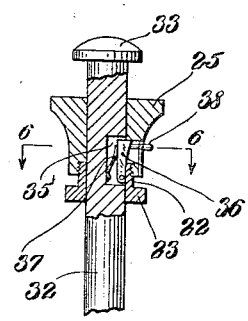
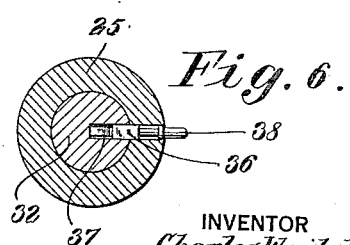
INVENTOR
Charles Waibel.
BY
his ATTORNEY

UNITED STATES PATENT OFFICE.

CHARLES WAIBEL, OF NEW YORK, N. Y.

FOOD-CONTAINER.

1,288,313.  Specification of Letters Patent.  Patented Dec. 17, 1918.

Application filed May 20, 1918. Serial No. 235,483.

*To all whom it may concern:*

Be it known that I, CHARLES WAIBEL, a subject of the Emperor of Germany, residing at New York, county of New York, and State of New York, have invented certain new and useful Improvements in Food-Containers, of which the following is a specification.

This invention relates to improvements in food containers, particularly to types adapted for domestic and show purposes, the principal object of the invention being to provide a receptacle in which food may be contained uncontaminated by exposure for a considerable period of time.

A further object is to provide the support upon which food may be placed with a transparent casing whereby flies, dust and particles in the air are prevented from touching the food when the cover is in contact with the support.

A still further object is to provide means for maintaining the covering when in a raised position, permitting convenient access to the food or whatever other goods may be disposed upon the plate support.

These and other like objects are attained by the novel construction and combination of parts hereinafter described and shown in the accompanying drawings, forming a material part of this disclosure, and in which:—

Figure 1 is a perspective view, showing an embodiment of a container made in accordance with the invention.

Fig. 2 is a vertical sectional view of the same.

Fig. 3 is a side elevational view, showing a modified form of container.

Fig. 4 is a vertical sectional view taken substantially through the center of the same.

Fig. 5 is an enlarged fragmentary view, showing the upper portion of the guide post with which the cover is engaged, and Fig. 6 is a further enlarged transverse sectional view, taken on line 6—6 of Fig. 5.

In the embodiment shown in Figs. 1 and 2, resting upon a table or like level support 10, is the base 14 of the container, here shown to be circular and joined by a reduced stem 15 to the enlarged upper portion 16, which is formed with or connected to a plate 18 upon which the food or other articles are disposed.

Adapted to rest upon its edges on the plate 18 is a concavo-convex, transparent cover 20, containing a central opening 21, through which passes the stem 22 of a support element, having an enlarged head 23, the stem being screwed into a knob 25, slidable upon a depending rod 26, carried by the curved support 27, which may have lower elements 28 engaged with a ring or band 29, encircling the stem 15, or as shown in Fig. 2, be secured by screws 30 or similar fastenings directly to the edge of the plate 18.

In the adaptation shown in Figs. 3 and 4, a plain flat circular plate or disk 30 is provided for food or other articles, the plate having engaged at its center the base 31 of a post 32, having a head 33 at its extreme upper end. The transparent cover 20 is adapted to rest upon its lower level edges on the plate 30, and has at its center an opening containing a stem 22, having a supporting head 23, the stem being inserted into the knob 25 in the manner before described.

In the upper portion of the central supports 26 and 32 is a recess 35 in which is pivoted a pawl 36 normally pressed outward by the flat spring 37, set in the bottom of the recess and adapted to engage with the lower side of the head 23 when the cover to which it is attached is raised upon the supports.

In order to retract the pawl 36, when it is desired to lower the cover, a plunger 38 is slidably arranged within the knob 25, so that upon pressing the same, the pawl is forced back, permitting the knob and cover to be lowered in an obvious manner.

From the foregoing, it will be seen that a protecting cover is provided for whatever goods may be disposed upon the supporting plate and that the cover may be maintained in a raised position in an efficient manner by merely raising it to a fixed predetermined height, also, that it is readily possible to release the retaining means permitting the cover to be lowered into operative position by depressing the plunger 38.

Having thus described my invention what I claim as new and desire to secure by Letters Patent, is.

In a food container of the character described, the combination with a base, of a circular plate adapted to support articles of food, a concavo-convex transparent cover having a central opening resting with its lower edge upon said plate, a central post on said plate passing through the opening in said cover, and provided with a lateral recess near its upper end, a head on said post, a knob on said post at its passage through said opening, a stem screwed into said knob, a head on said stem for supporting the cover, a vertically disposed pawl pivoted within the lateral recess of said post, a flat spring in said recess for normally pressing said pawl outward, and a plunger slidably arranged within said knob adapted to be pressed down for forcing the pawl back to permit the cover to be lowered upon said plate.

In testimony whereof I have affixed my signature.

CHARLES WAIBEL.

Copies of this patent may be obtained for five cents each, by addressing the "Commissioner of Patents, Washington, D. C."